US010386904B2

(12) United States Patent
Podaima et al.

(10) Patent No.: US 10,386,904 B2
(45) Date of Patent: Aug. 20, 2019

(54) HARDWARE MANAGED POWER COLLAPSE AND CLOCK WAKE-UP FOR MEMORY MANAGEMENT UNITS AND DISTRIBUTED VIRTUAL MEMORY NETWORKS

(71) Applicant: QUALCOMM Incorporated, San Diego, CA (US)

(72) Inventors: Jason Edward Podaima, Markham (CA); Christophe Denis Bernard Avoinne, Campbell, CA (US); Manokanthan Somasundaram, Markham (CA); Sina Dena, San Diego, CA (US); Paul Christopher John Wiercienski, Toronto (CA); Bohuslav Rychlik, San Diego, CA (US); Steven John Halter, San Diego, CA (US); Jaya Prakash Subramaniam Ganasan, Youngsville, NC (US); Myil Ramkumar, Richmond Hill (CA); Dipti Ranjan Pal, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/086,054

(22) Filed: Mar. 31, 2016

(65) Prior Publication Data

US 2017/0285705 A1 Oct. 5, 2017

(51) Int. Cl.

| | |
|---|---|
| ***G06F 1/26*** | (2006.01) |
| ***G06F 1/10*** | (2006.01) |

(Continued)

(52) U.S. Cl.

CPC ................ *G06F 1/266* (2013.01); *G06F 1/10* (2013.01); *G06F 1/324* (2013.01); *G06F 1/3275* (2013.01);

(Continued)

(58) Field of Classification Search

None

See application file for complete search history.

(56) References Cited

U.S. PATENT DOCUMENTS 5,692,192 A * 11/1997 Sudo .................... G06F 9/5088 711/147
5,884,100 A 3/1999 Normoyle et al.

(Continued)

OTHER PUBLICATIONS

ARM Limited: "AMBA AXI(TM) and ACE(TM) Protocol Specification", Oct. 28, 2011, XP055133775, Retrieved from the Internet: URL:https://capocaccia.ethz.ch/capo/raw-attachment/wiki/2014microblaze14/AX14_specification.pdf [retrieved on Aug. 7, 2014], pp. 1-306.

(Continued)

*Primary Examiner* — Paul Yen

(74) *Attorney, Agent, or Firm* — Muncy, Geissler, Olds & Lowe

(57) ABSTRACT

Methods and systems are disclosed for full-hardware management of power and clock domains related to a distributed virtual memory (DVM) network. An aspect includes transmitting, from a DVM initiator to a DVM network, a DVM operation, broadcasting, by the DVM network to a plurality of DVM targets, the DVM operation, and, based on the DVM operation being broadcasted to the plurality of DVM targets by the DVM network, performing one or more hardware optimizations comprising: turning on a clock domain coupled to the DVM network or a DVM target of the plurality of DVM targets that is a target of the DVM operation, increasing a frequency of the clock domain, (Continued)

turning on a power domain coupled to the DVM target based on the power domain being turned off, or terminating the DVM operation to the DVM target based on the DVM target being turned off.

22 Claims, 10 Drawing Sheets

(51) Int. Cl.

| | |
|---|---|
| ***G06F 1/324*** | (2019.01) |
| ***G06F 1/3234*** | (2019.01) |
| ***G06F 1/3287*** | (2019.01) |
| *G06F 12/08* | (2016.01) |

(52) U.S. Cl.

CPC ............ *G06F 1/3287* (2013.01); *G06F 12/08* (2013.01); *G06F 2212/1028* (2013.01); *G06F 2212/657* (2013.01); *G06F 2212/683* (2013.01); *Y02D 10/126* (2018.01); *Y02D 10/13* (2018.01); *Y02D 10/14* (2018.01); *Y02D 10/171* (2018.01)

(56) References Cited

U.S. PATENT DOCUMENTS

| | | | | |
|---|---|---|---|---|
| 6,889,254 | B1 * | 5/2005 | Chandra | G06F 17/30545 707/E17.032 |
| 8,244,978 | B2 | 8/2012 | Kegel et al. | |
| 2002/0010891 | A1 * | 1/2002 | Klein | G06F 11/1008 714/767 |
| 2003/0025689 | A1 * | 2/2003 | Kim | G06F 1/3203 345/211 |
| 2008/0046707 | A1 * | 2/2008 | Hirai | G06F 1/26 713/1 |
| 2008/0263309 | A1 * | 10/2008 | Attinella | G06F 11/3636 711/173 |
| 2009/0204831 | A1 | 8/2009 | Cousson et al. | |
| 2010/0162235 | A1 * | 6/2010 | Ginzton | G06F 9/455 718/1 |
| 2013/0009695 | A1 * | 1/2013 | Boucard | G11C 5/14 327/530 |
| 2013/0031333 | A1 | 1/2013 | Sankaran et al. | |
| 2013/0117521 | A1 | 5/2013 | Li et al. | |
| 2013/0227245 | A1 | 8/2013 | Gupta et al. | |
| 2014/0258663 | A1 * | 9/2014 | Zeng | G06F 21/79 711/163 |
| 2016/0055110 | A1 * | 2/2016 | Herbeck | G06F 13/4022 710/316 |

OTHER PUBLICATIONS

ARM Limited: "Corelink MMU-401 System Memory Management Unit Technical Reference Manual", Mar. 14, 2013, XP055377833, Retrieved from the Internet: URL:http://infocenter.arm.com/help/topic/com.arm.doc.ddi0521a/0010521 A_corelink_mmu_ 401_ rOpO_ _trm.pdf [retrieved on Jun. 1, 2017], 106 pages.

International Search Report and Written Opinion—PCT/US2017/022158—ISA/EPO—dated Jun. 27, 2017.

* cited by examiner

HARDWARE MANAGED POWER COLLAPSE AND CLOCK WAKE-UP FOR MEMORY MANAGEMENT UNITS AND DISTRIBUTED VIRTUAL MEMORY NETWORKS

FIELD OF DISCLOSURE

Aspects of this disclosure relate to hardware managed power collapse and clock wake-ups for memory management units (MMUs) and distributed virtual memory (DVM) networks, and related concepts.

BACKGROUND

A "DVM network" is a broadcast network within the hardware/software architecture of a system-on-a-chip (SoC) designed to broadcast "DVM operations" from a "DVM initiator" to all "DVM targets" of the DVM network. The DVM network is responsible for merging responses from the DVM targets and presenting a single unified response back to the DVM initiator. DVM operations may include translation lookaside buffer (TLB) invalidate operations to TLBs located at a DVM target, synchronization operations to ensure completion of previous DVM operations, instruction cache invalidate operations to instruction caches located at a DVM target, and other related operations.

DVM networks use a protocol based on the Advanced Microcontroller Bus Architecture (AMBA) 4 Advanced Extensible Interface (AXI) Coherency Extensions (ACE) standard from ARM Ltd. AMBA 4 is an open-standard, on-chip interconnect specification for the connection and management of functional blocks in SoC designs. The standard specification only describes the "protocol" for DVM networks and does not mandate a specific implementation of the DVM network.

SUMMARY

The following presents a simplified summary relating to one or more aspects and/or aspects disclosed herein. As such, the following summary should not be considered an extensive overview relating to all contemplated aspects and/or aspects, nor should the following summary be regarded to identify key or critical elements relating to all contemplated aspects and/or aspects or to delineate the scope associated with any particular aspect and/or aspect. Accordingly, the following summary has the sole purpose to present certain concepts relating to one or more aspects and/or aspects relating to the mechanisms disclosed herein in a simplified form to precede the detailed description presented below.

A method for full-hardware management of power and clock domains related to a distributed virtual memory (DVM) network, includes transmitting, from a DVM initiator to a DVM network, a DVM operation, broadcasting, by the DVM network to a plurality of DVM targets, the DVM operation, and, based on the DVM operation being broadcasted to the plurality of DVM targets by the DVM network, performing one or more hardware functions comprising: turning on a clock domain coupled to the DVM network or a DVM target of the plurality of DVM targets that is a target of the DVM operation, increasing a frequency of the clock domain coupled to the DVM network or the DVM target of the plurality of DVM targets that is the target of the DVM operation, turning on a power domain coupled to the DVM target of the plurality of DVM targets that is the target of the DVM operation based on the power domain being turned off, terminating the DVM operation to the DVM target of the plurality of DVM targets that is the target of the DVM operation based on the DVM target being turned off, or any combination thereof.

An apparatus for full-hardware management of power and clock domains related to a DVM network, includes a DVM initiator, a plurality of DVM targets, a DVM network coupled to the DVM initiator and the plurality of DVM targets, wherein the DVM network is configured to broadcast DVM operations from the DVM initiator to the plurality of DVM targets, wherein, based on a DVM operation in the DVM network being broadcasted to the plurality of DVM targets: a clock domain coupled to the DVM network or a DVM target of the plurality of DVM targets that is a target of the DVM operation is turned on, a frequency of the clock domain coupled to the DVM network or the DVM target of the plurality of DVM targets that is the target of the DVM operation is increased, a power domain coupled to the DVM target of the plurality of DVM targets that is the target of the DVM operation is turned on based on the power domain being turned off, the DVM operation to the DVM target of the plurality of DVM targets that is the target of the DVM operation is terminated based on the DVM target being turned off, or any combination thereof.

An apparatus for full-hardware management of power and clock domains related to a DVM network, includes means for transmitting, to a DVM network, a DVM operation, means for broadcasting, to a plurality of DVM targets, the DVM operation, and means for performing, based on the DVM operation being broadcasted to the plurality of DVM targets by the DVM network, one or more hardware functions comprising: turn on a clock domain coupled to the DVM network or a DVM target of the plurality of DVM targets that is a target of the DVM operation, increase a frequency of the clock domain coupled to the DVM network or the DVM target of the plurality of DVM targets that is the target of the DVM operation, turn on a power domain coupled to the DVM target of the plurality of DVM targets that is the target of the DVM operation based on the power domain being turned off, terminate the DVM operation to the DVM target of the plurality of DVM targets that is the target of the DVM operation based on the DVM target being turned off, or any combination thereof.

Other objects and advantages associated with the aspects and aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
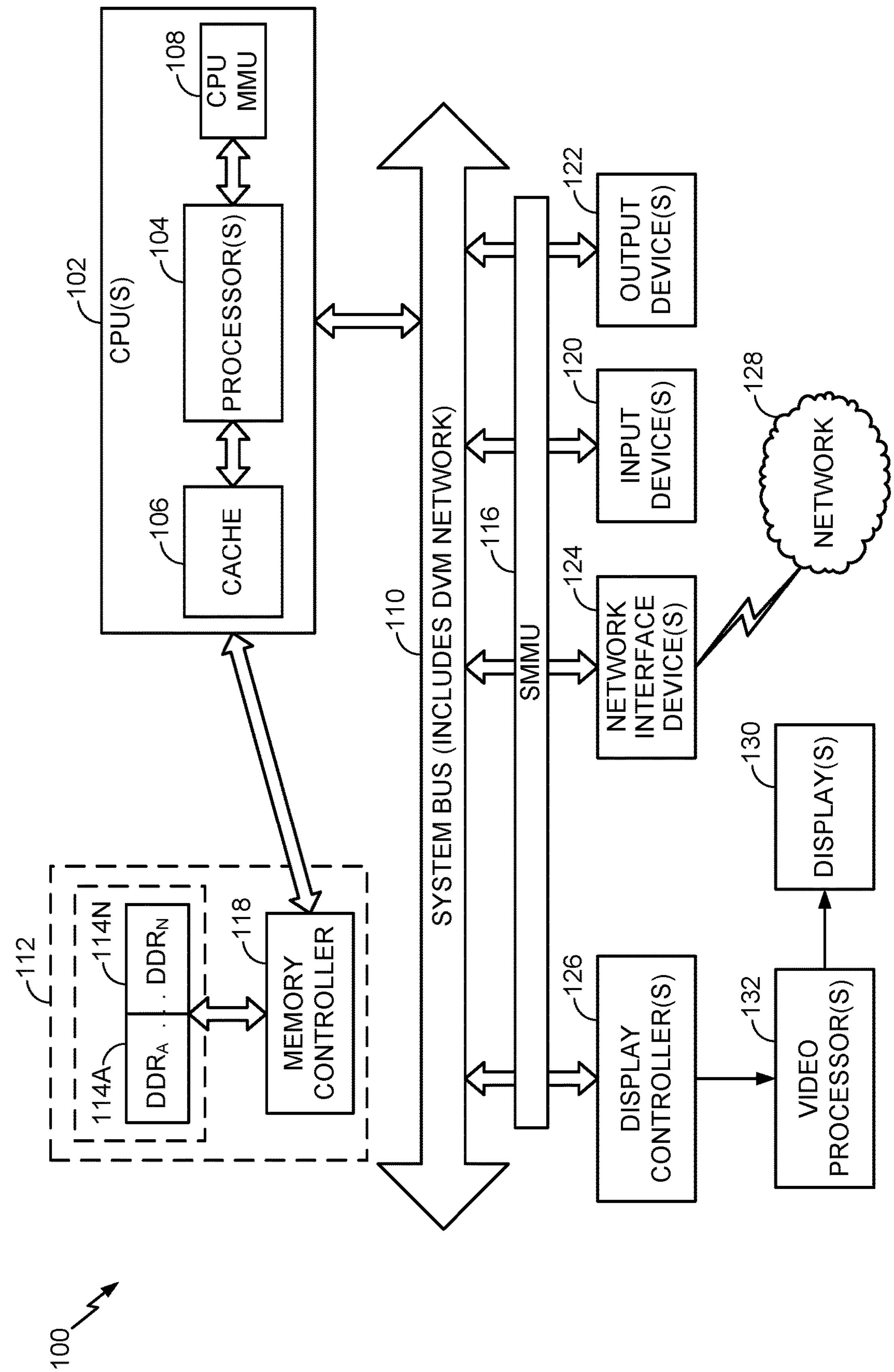
FIG. 1 is a block diagram of an exemplary processor-based system that can include a plurality of system memory management units (SMMUs) according to at least one aspect of the disclosure.

Methods and systems are disclosed for full-hardware management of power and clock domains related to a distributed virtual memory (DVM) network. An aspect includes transmitting, from a DVM initiator to a DVM network, a DVM operation, broadcasting, by the DVM network to a plurality of DVM targets, the DVM operation, and, based on the DVM operation being broadcasted to the plurality of DVM targets by the DVM network, performing one or more hardware functions comprising: turning on a clock domain coupled to the DVM network or a DVM target of the plurality of DVM targets that is a target of the DVM operation, increasing a frequency of the clock domain coupled to the DVM network or the DVM target of the plurality of DVM targets that is the target of the DVM operation, turning on a power domain coupled to the DVM target of the plurality of DVM targets that is the target of the DVM operation based on the power domain being turned off, or terminating the DVM operation to the DVM target of the plurality of DVM targets that is the target of the DVM operation based on the DVM target being turned off.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, various aspects are described in terms of sequences of actions to be performed by, for example, elements of a computing device. It will be recognized that various actions described herein can be performed by specific circuits (e.g., application specific integrated circuits (ASICs), systems-on-a-chip (SoCs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Providing full-hardware management of power and clock domains related to a DVM network, according to aspects disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, etc.

In this regard, FIG. 1 illustrates an example of a processor-based system 100 according to at least one aspect of the disclosure. In this example, the processor-based system 100 includes one or more central processing units (CPUs) 102, each including one or more processors 104. The CPU(s) 102 may have cache memory 106 coupled to the processor(s) 104 for rapid access to temporarily stored data. The CPU(s) 102 further includes a CPU memory management unit (MMU) 108 for providing address translation services for CPU memory access requests. The CPU(s) 102 can communicate transaction requests to a memory controller 118 of a memory system 112, which provides memory units 114A-114N.

The CPU(s) 102 is coupled to a system bus 110 (which includes a DVM network (not shown)) that can intercouple master and slave devices included in the processor-based system 100. The CPU(s) 102 communicates with these other devices by exchanging address, control, and data information over the system bus 110. In the example of FIG. 1, an SMMU 116 is coupled to the system bus 110. Other master and slave devices can be connected to the system bus 110 via the SMMU 116. As illustrated in FIG. 1, these devices can include one or more input devices 120, one or more output devices 122, one or more network interface devices 124, and one or more display controllers 126, as examples. The input device(s) 120 can include any type of input device, including but not limited to input keys, switches, voice processors, etc. The output device(s) 122 can include any type of output device, including but not limited to audio, video, other visual indicators, etc. The network interface device(s) 124 can be any devices configured to allow exchange of data to and from a network 128. The network 128 can be any type of network, including but not limited to a wired or wireless network, a private or public network, a local area network (LAN), a wide local area network (WLAN), the Internet, etc. The network interface device(s) 124 can be configured to support any type of communications protocol desired.

The CPU(s) 102 may also be configured to access the display controller(s) 126 over the system bus 110 to control information sent to one or more displays 130. The display controller(s) 126 sends information to the display(s) 130 to be displayed via one or more video processors 132, which process the information to be displayed into a format suitable for the display(s) 130. The display(s) 130 can include any type of display, including but not limited to a cathode ray tube (CRT), a liquid crystal display (LCD), a plasma display, etc.

The system bus 110 includes a DVM network that couples a DVM initiator (e.g., CPU(s) 102) to one or more DVM targets (e.g., SMMU 116). The DVM network (part of system bus 110) is included within the hardware/software architecture of a SoC to broadcast "DVM operations" from a "DVM initiator," such as CPU 102, to all "DVM targets," such as SMMU 116, of the DVM network.

Figure 2:
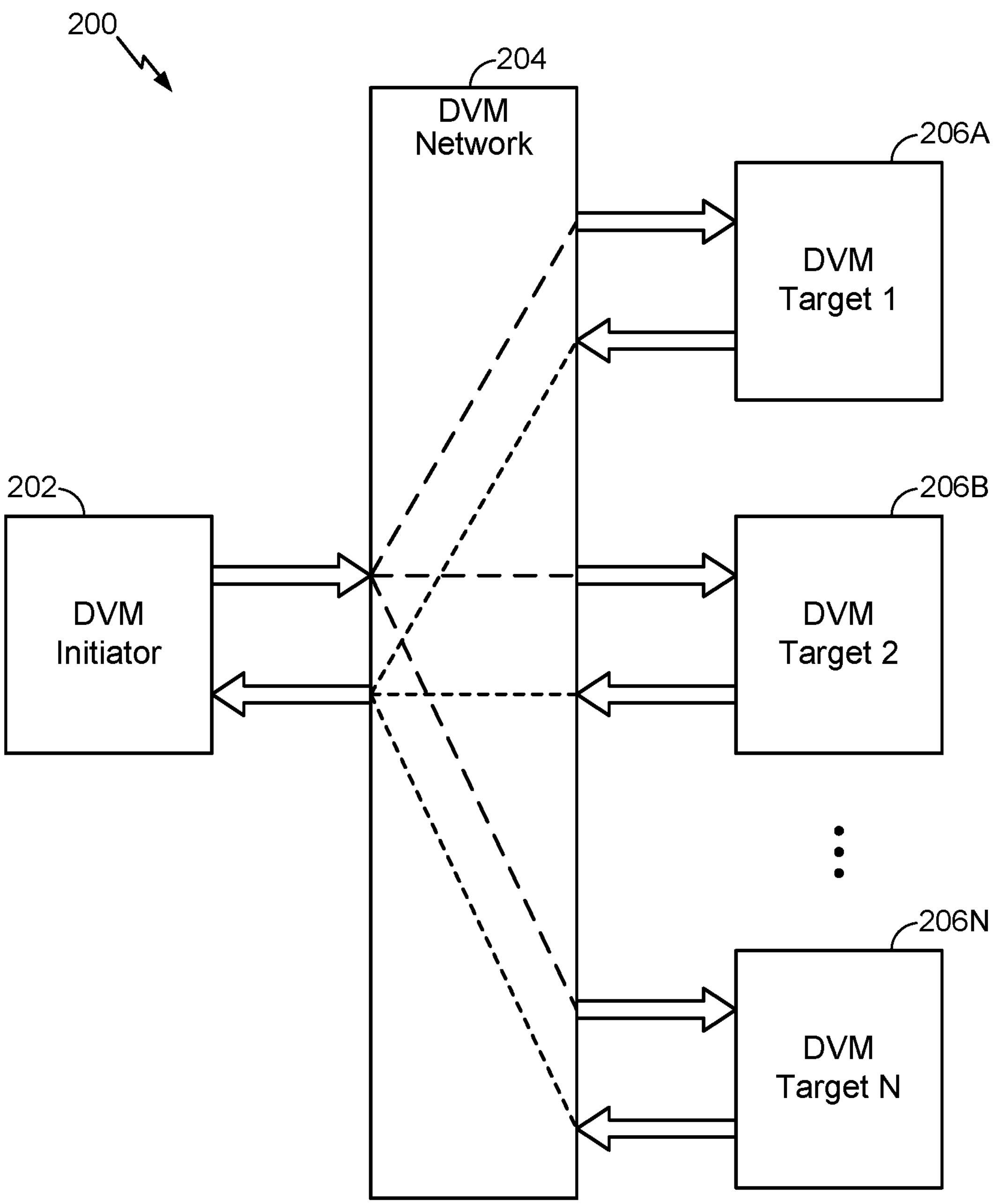
FIG. 2 illustrates an exemplary system that includes a distributed virtual memory (DVM) initiator, a DVM network, and DVM targets according to at least one aspect of the disclosure.

FIG. 2 illustrates an exemplary system 200 that includes a DVM initiator 202, a DVM network 204, and DVM targets 206A to 206N according to at least one aspect of the disclosure. The DVM network 204 is responsible for merging responses from the DVM targets 206A to 206N and presenting a single unified response back to the DVM initiator 202. More specifically, the DVM network 204 waits for all of the responses from the DVM targets 206A to 206N, combines (or "merges") them into a single response, and returns the single response to the DVM initiator 202. DVM operations may include translation lookaside buffer (TLB) invalidate operations to TLBs located at a DVM target, synchronization operations to ensure completion of previous DVM operations, instruction cache invalidate operations to instruction caches located at a DVM target, etc.

DVM networks, such as the DVM network 204, may use a protocol based on the AMBA 4 ACE standard from ARM Ltd. AMBA 4 is an open-standard, on-chip interconnect specification for the connection and management of functional blocks in SoC designs. The standard specification only describes the "protocol" for DVM networks and does not mandate a specific implementation of the DVM network. For example, clocking and power collapse and many other implementation details are beyond the scope of the standard specification.

In an aspect, the DVM targets 206A to 206N may be SMMUs. An SMMU is a DVM target comprising a TLB that receives DVM operations from the DVM network, such as the DVM network 204. When an SMMU receives a TLB invalidate operation over the DVM network 204, for example, the SMMU: 1) returns a TLB invalidate acknowledgement to the DVM network 204, and 2) performs the TLB invalidate on the TLB (and any cached translations). When an SMMU receives a sync operation over the DVM network 204, for example, the SMMU: 1) ensures that previously posted TLB invalidates are performed, and 2) ensures that client requests (e.g., read/write/etc.) that were using old/targeted TLB entries have been globally observed before returning a "sync complete."

Figure 3A:
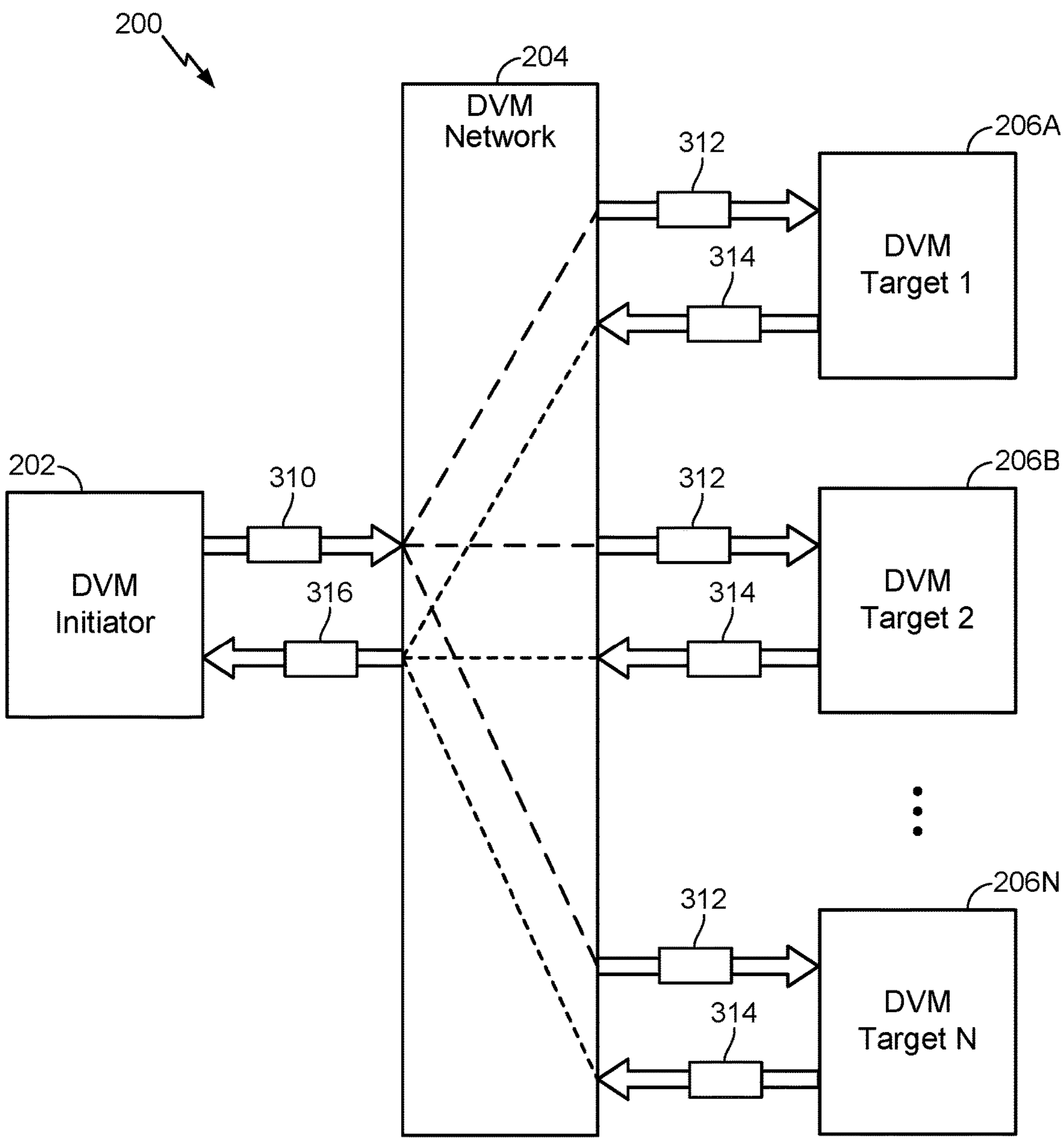
FIG. 3A illustrates an exemplary TLB Invalidate by Virtual Address (TLBIVA) operation performed by the system of FIG. 2 according to at least one aspect of the disclosure.

FIG. 3A illustrates an exemplary "TLB Invalidate by Virtual Address" (TLBIVA) operation performed by the system 200 of FIG. 2 according to at least one aspect of the disclosure. The DVM initiator 202 issues a TLBIVA operation (represented as block 310) over the DVM network 204. The DVM network 204 broadcasts the TLBIVA operation (represented as block 312) to all DVM targets, i.e., DVM targets 206A to 206N. Each DVM target 206A to 206N acknowledges receipt of the TLBIVA operation and provides an acknowledgement response (represented as block 314) to the DVM network 204. The DVM network 204 merges all acknowledgment responses from the DVM targets and presents a unified receipt response (represented as block 316) back to the DVM initiator 202.

Figure 3B:
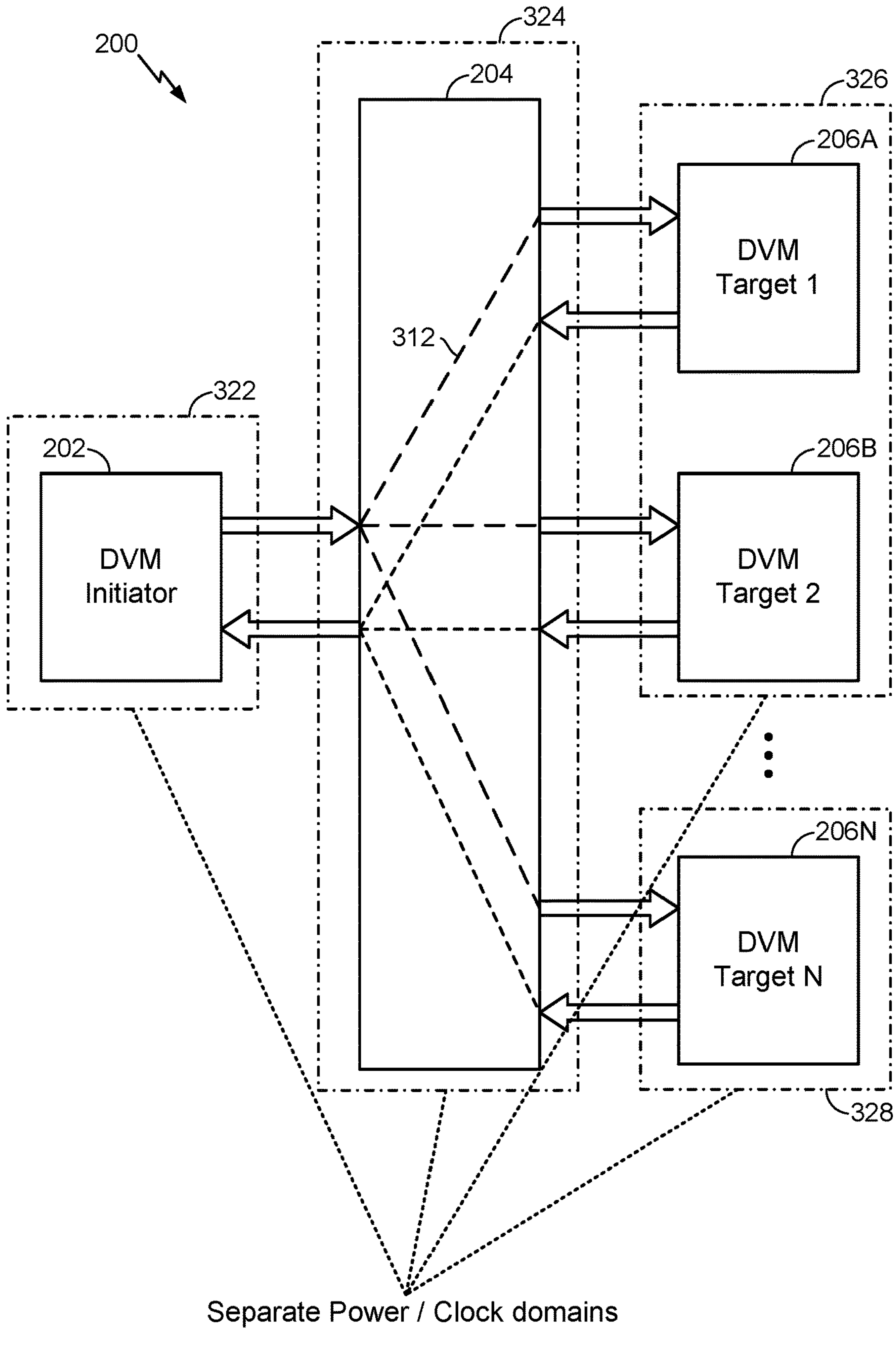
FIG. 3B illustrates the system of FIG. 2 in which each of the DVM initiators, the DVM network, and the DVM targets are on separate clock and power domains according to at least one aspect of the disclosure.

For power optimization and/or performance reasons, it is sometimes desirable to have SMMUs/DVM targets on a separate clock domain and a separate power domain. FIG. 3B illustrates the system 200 of FIG. 2 in which each of the DVM initiators 202, the DVM network 204, and the DVM targets 206A to 206N are on separate clock and power domains according to at least one aspect of the disclosure. In the example of FIG. 3B, the DVM initiator 202 is on its own clock and power domain 322, the DVM network 204 is on its own clock and power domain 324, the DVM targets 206A and 206B are on their own clock and power domain 326, and the DVM target 206N is on its own clock and power domain 328. The DVM targets 206A to 206N may each be on a separate clock and power domain, or all of the DVM targets 206A to 206N may be on the same clock and power domain, or different groups of the DVM targets 206A to 206N may be on different clock and power domains (as illustrated in FIG. 3B).

The introduction of multiple clock and multiple power domains within the DVM network 204 can place a burden on software if the clock domains and power domains are software managed/controlled. In such cases, when a TLB invalidate is issued from the CPU (such as the CPU(s) 102 in FIG. 1), and/or the DVM initiator 202 and the DVM network 204 must be software managed when a DVM target of the DVM targets 206A to 206N is power collapsed (i.e., powered off).

Having the DVM network 204 and all of the DVM targets 206A to 206N on a single clock and power domain simplifies the problem. However, this may lead to undesirable latency performance profiles if, for example, the DVM network 204 and the DVM targets 206A to 206N are forced to operate on a single fast/slow clock. It may also lead to undesirable power performance profiles if, for example, the DVM network 204 and the DVM targets 206A to 206N are "always powered."

Accordingly, the present disclosure presents a mechanism for full hardware management of the power and clock domains relating to a DVM network, such as the DVM network 204, and the DVM targets, such as the DVM targets 206A to 206N. In an aspect, the disclosed hardware mechanism can 1) turn on the relevant clocks based on the presence of a DVM operations in the DVM network 204 (and then, when the operation is done, the relevant clocks are turned back off), 2) speed up the relevant clocks based on the presence of a DVM operation in the DVM network 204 (and then, when the operation is done, the relevant clocks are slowed back down), and/or 3) automatically terminate DVM operations that are broadcast to the DVM targets 206A to 206N that have power collapsed, as appropriate. Optionally, a DVM target 206A to 206N that is power collapsed can be "powered-up" based on the presence of DVM operations in the DVM network 204.

Points 1 and 2 above ensure low latency (due to the high performance DVM network response). The impact of the present disclosure includes releasing the software from the burden of having to software manage the DVM network 204 prior to a DVM target 206A to 206N being powered off, and releasing the software from the burden of having to software manage clocks prior to the DVM initiator 202 issuing a DVM operation (e.g., a TLB invalidate).

Figure 4:
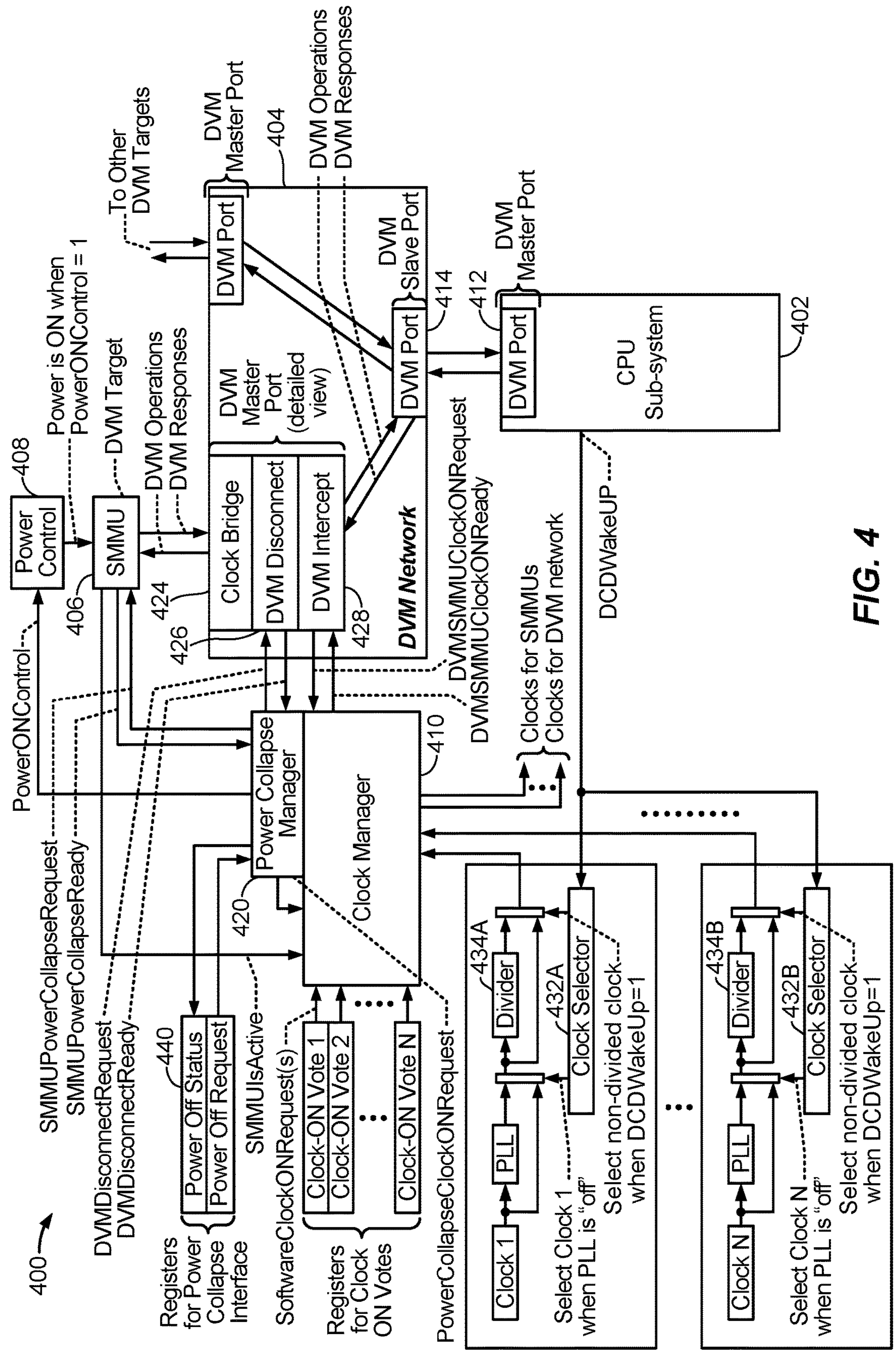
FIG. 4 illustrates an exemplary system for full-hardware management of power and clock domains related to a DVM network and DVM targets according to at least one aspect of the disclosure.

FIG. 4 illustrates an exemplary system 400 for full-hardware management of power and clock domains related to a DVM network and DVM targets according to at least one aspect of the disclosure. The system 400 includes a CPU subsystem 402, which may correspond to the CPU 102 in FIG. 1, that acts as a DVM initiator. The CPU subsystem/DVM initiator 402 issues commands/DVM operations to a DVM network 404, which may be part of the system bus 110 in FIG. 1, via a DVM master port 412 at the CPU subsystem/DVM initiator 402 and a DVM slave port 414 at the DVM network 404. The DVM network 404 broadcasts the commands/DVM operations to the DVM targets, such as DVM target 406 (e.g., an SMMU), which may correspond to SMMU 116 in FIG. 1.

A DVM interceptor 428 ensures that no DVM operations pass through to the DVM targets unless all downstream target DVM clocks are turned on. The DVM interceptor 428 includes logic to stop any DVM operations until the relevant clocks are turned on. The DVM interceptor 428 communicates with a clock manager 410, which is responsible for turning on any clocks related to the DVM operations that are turned off.

When a DVM target, such as the DVM target 406, is power collapsed, a DVM disconnect module 426 communicates with a power collapse manager 420 to ensure the proper shutdown of the DVM target 406. The power collapse manager 420 communicates with the DVM target 406 to ensure the proper shutdown/power collapse of the DVM target 406. The power collapse manager 420, via the DVM disconnect module 426, communicates with the DVM network 404 to ensure that the DVM network 404 provides the proper response to the DVM initiator, i.e., the CPU subsystem/DVM initiator 402. The power collapse manager 420 also reads "Power Off Requests" from and writes "Power Off Status" to the registers for the power collapse interface 440.

A clock bridge 424 is an interconnection device that allows communication (DVM communication in this case) between two seperate clock domains. For example, here, the DVM network 404 is on one clock domain while the DVM target 406 is on a seperate clock domain, thus requiring a "clock bridge" to bridge the two clock domains.

The CPU subsystem/DVM initiator 402 may issue a dynamic clock divide (DCD) wakeup command to clock selectors 432A and 432B. The clock selectors 432A and 432B select the fastest clock when there is DVM activity by causing the clock dividers 434A and 434B to be bypassed. More specifically, when the DCD wakeup command is "1," the clock selectors 432A and 432B cause the multiplexors coupled to the clock dividers 434A and 434B to select the undivided clock signal and send it to the clock manager 410. This causes the corresponding clock circuitry to speed up the clock.

The clock manager 410 may also receive votes to keep a given clock on, represented in FIG. 4 as SoftwareClockON-Request(s). As long as there is at least one vote to keep a clock on, that clock will remain on.

Figure 5:
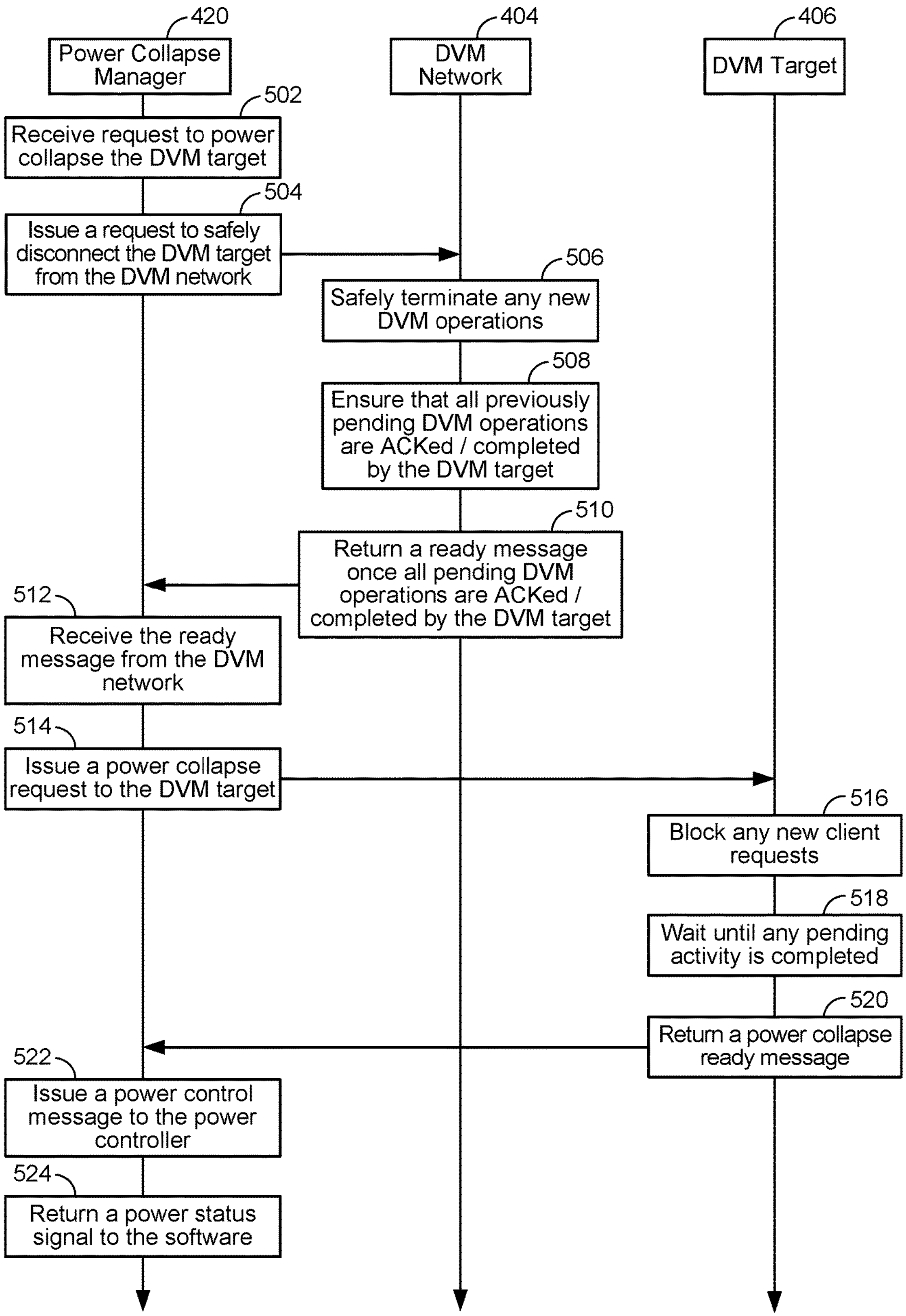
FIG. 5 illustrates an exemplary flow for power collapsing a DVM target in the system of FIG. 4 according to at least one aspect of the disclosure.

FIG. 5 illustrates an exemplary flow for power collapsing (i.e., powering off) a DVM target, such as the DVM target 406 (e.g., an SMMU), in the system 400 of FIG. 4 according to at least one aspect of the disclosure.

At 502, the power collapse manager 420 receives a request from the software being currently executed to power collapse the DVM target 406. The software asserts the request by writing a "Power Collapse Request" in the registers for the power collapse interface 440 in FIG. 4. Alternatively, instead of the software triggering a power-off of the DVM target 406, a signal from the CPU subsystem/DVM initiator 402 in FIG. 4 or the DVM network 404 may trigger the power-off sequence. This signal would indicate that no pending DVM requests in the DVM network 404 are permitted to trigger a power-collapse event when there is no other activity that causes the DVM target 406 to be powered. The power collapse manager 420 would receive this signal and use it as a means to determine when to power down the DVM target 406. The TLB contents of the DVM target 406 would be "retained" even when the main power is "off" by way of retention circuits, or a secondary storage unit.

At 504, the power collapse manager 420 issues a DVM-DisconnectRequest message to the DVM network 404 to safely disconnect the DVM target 406 from the DVM network 404. At 506, once the DVM network 404 receives the DVMDisconnectRequest message, the DVM network 404 safely terminates any new DVM operations, such that new DVM operations do not reach the DVM target 406. Terminating the DVM operations ensures that any new DVM operation is acknowledged/completed and that the DVM initiator (e.g., the CPU subsystem 402) receives a valid non-error response indicating that the terminated transaction was acknowledged/completed "normally" (i.e., without error).

At 508, the DVM network 404 ensures that all previously pending DVM operations are acknowledged or completed by the DVM target 406. At 510, the DVM network 404 returns a DVMDisconnectReady message once all pending DVM operations are acknowledged or completed by the DVM target 406.

At 512, the power collapse manager 420 receives the DVMDisconnectReady message from the DVM network 404. At 514, the power collapse manager 420 issues a SMMUPowerCollapseRequest message to the DVM target 406.

At 516, once the DVM target 406 receives the power collapse request, the DVM target 406 blocks any new client requests (e.g., DVM operations from the CPU subsystem/DVM initiator 402). At 518, the DVM target 406 waits until any pending activity is completed (e.g., all outstanding client requests are completed, and all outstanding translation table walks are completed). At 520, once all pending activity in the DVM target 406 is completed, the DVM target 406 returns a SMMUPowerCollapseReady message.

At 522, the power collapse manager 420 issues a PowerONControl=0 message to a power controller 408. Once the power controller 408 receives the PowerONControl=0 message, it removes the power from the DVM target 406 (thereby power collapsing the DVM target 406) and associated components.

At 524, the power collapse manager 420 returns a power status signal indicating that the power has been removed from the DVM target 406. This status is readable by the software via the registers for the power collapse interface 440.

Figure 6:
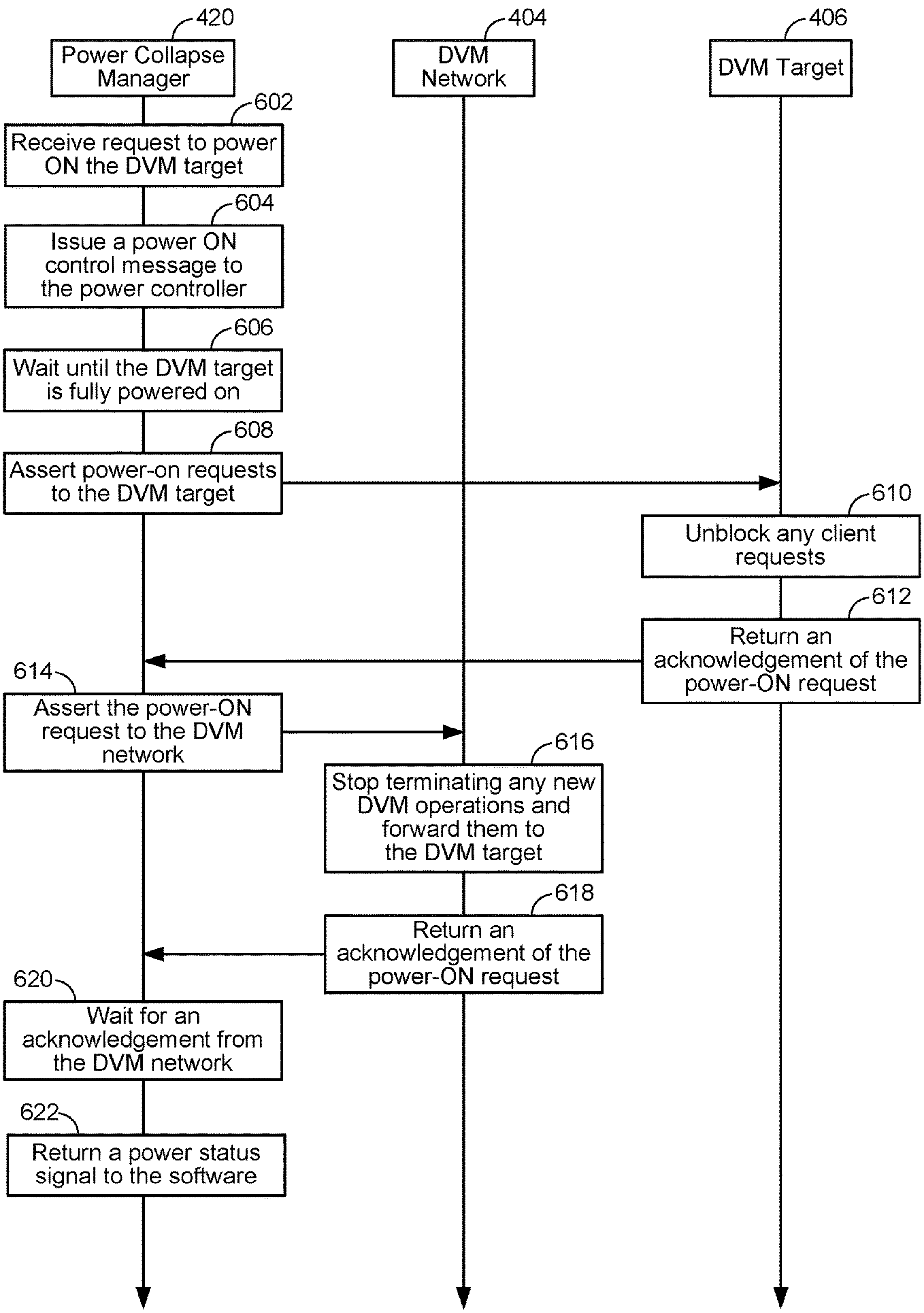
FIG. 6 illustrates an exemplary flow for powering on a DVM target in the system of FIG. 4 according to at least one aspect of the disclosure.

FIG. 6 illustrates an exemplary flow for powering on a DVM target, such as the DVM target 406 (e.g., an SMMU), in the system 400 of FIG. 4 according to at least one aspect of the disclosure.

At 602, the power collapse manager 420 receives a request from the software currently being executed to power ON the DVM target 406. The software asserts the request by de-asserting the "Power Collapse Request" in the registers for the power collapse interface 440. Alternatively, instead of the software triggering a power-ON of the DVM target 406, a handshake from the DVM network 404 may trigger the power-ON sequence. This handshake would be performed if a DVM operation is targeting the DVM target 406. The power collapse manager 420 would receive this power-ON request from the DVM network 404 and complete the handshake when the DVM target 406 is powered on.

At 604, the power collapse manager 420 issues a PowerONControl=1 message to the power controller 408. At 606, the power collapse manager 420 waits until the DVM target 406 is fully powered on. More specifically, the power collapse manager 420 waits for the power-ON status indicator from the power controller 408. Once the power controller 408 receives the PowerONControl=1 message, the DVM target 406 will be powered on. Once power is restored to the DVM target 406, the power controller 408 issues a reset message to the DVM target 406, and also issues a TLB reset message to the DVM target 406 to ensure that the TLB is "invalid" and contains no valid information. Note, this operation may not be performed for the alternative described above with reference to 602, since the TLB would contain valid information.

At 608, the power collapse manager 420 asserts a power-ON request to the DVM target 406 by de-asserting the SMMUPowerCollapseRequest message for the DVM target 406.

At 610, once the DVM target 406 receives the power-ON request, the DVM target 406 unblocks any client requests (e.g., DVM operations from the CPU subsystem/DVM initiator 402). At 612, the DVM target 406 returns a SMMUPowerCollapseReady=1 message to acknowledge the power-ON request and to indicate that it is ready for a subsequent power collapse.

At 614, the power collapse manager 420 asserts the power-ON request to the DVM network 404 by de-asserting the DVMDisconnectRequest message to the DVM network 404 to reconnect the DVM target 406 to the DVM network 404.

At 616, once the DVM network 404 receives the reconnect request from the power collapse manager 420 (i.e., the DVMDisconnectRequest=0 message), the DVM network 404 stops terminating any new DVM operations and forwards them (as normal) to the DVM target 406. At 618, the DVM network 404 returns an acknowledgement of the power-ON request to the power collapse manager 420.

At 620, the power collapse manager 420 waits for an acknowledgement from the DVM network 404. At 622, the power collapse manager 420 returns a power status signal indicating that the power has been applied to the DVM target 406. This status is readable by the software via the registers for the power collapse interface 440.

Figure 7A:
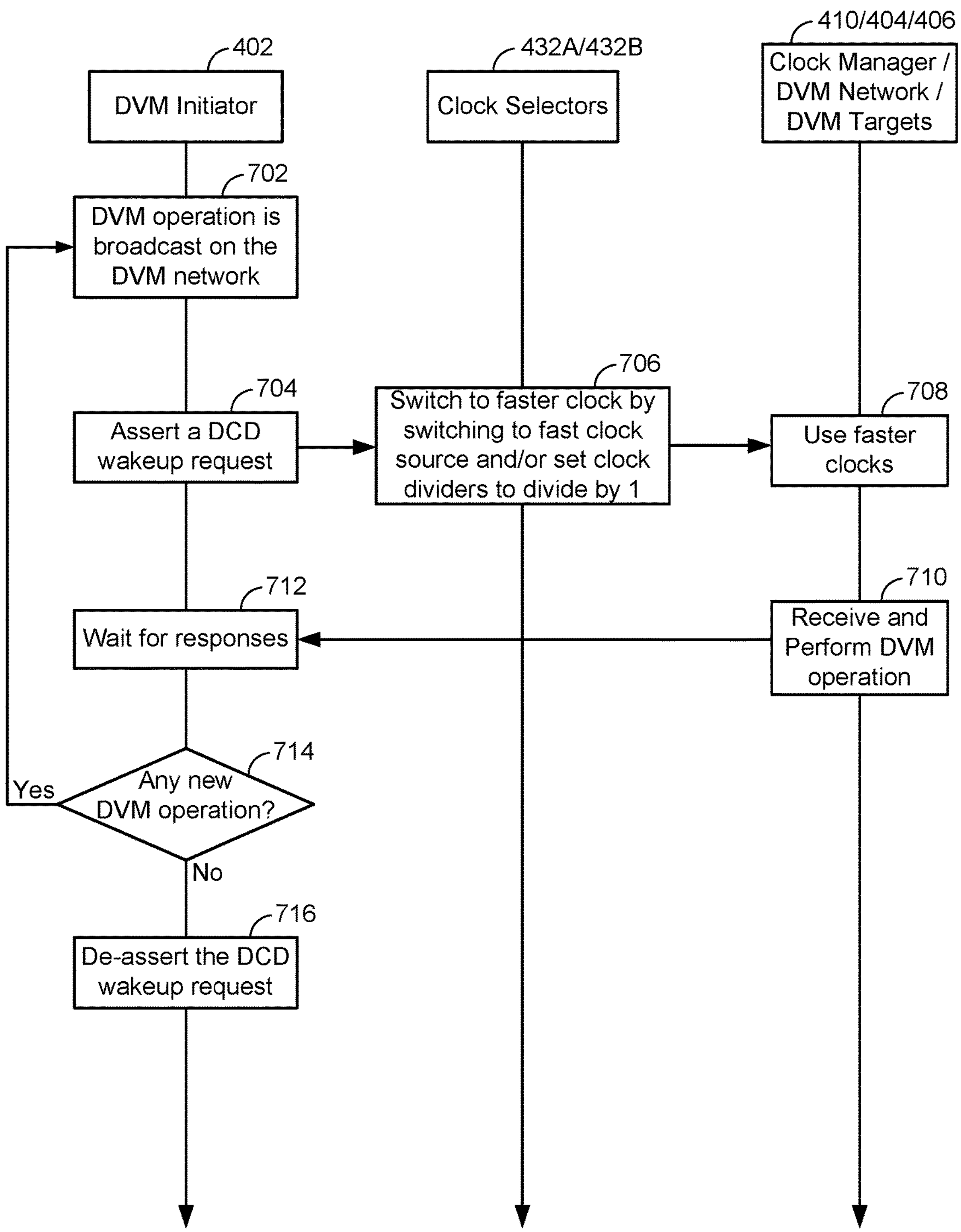
FIG. 7A illustrates an exemplary flow for automatic clock wake-up in the system of FIG. 4 according to at least one aspect of the disclosure.

FIG. 7A illustrates an exemplary flow for automatic clock wake-up in the system 400 of FIG. 4 according to at least one aspect of the disclosure. At 702, the DVM initiator 402 broadcasts a DVM operation on the DVM network 404. The present disclosure includes software programmed provisions to exclude a DVM target, such as the DVM target 406, from receiving DVM operations. Accordingly not all DVM targets will receive the "broadcasted" DVM operation.

At 704, the DVM initiator 402 asserts a DCDWakeUpRequest signal as an "early" indication that there is a pending DVM operation. Note, the DCDWakeUPRequest signal is an "early" indication of a pending DVM request since it is asserted long before the DVM operation reaches the DVM target 406. At 706, the clock selectors 432A and/or 432B receive the DCDWakeUpRequest signal and respond by switching to a faster clock frequency source and/or selecting the non-divided clock signal to send to the clock manager 410. The clock manager 410 uses these faster/non-divided clocks as the clock source for the SMMU/DVM target. By using the "faster" non-divided clock, the DVM network 404 and DVM targets are able to respond faster to the DVM operations that are broadcast over the DVM network 404.

At 708, the clock manager 410, the DVM network 404, and the DVM targets 406 use the faster clocks. At 710, the clock manager 410, the DVM network 404, and the DVM targets 406 receive and perform the DVM operation broadcasted at 702.

At 712, the DVM initiator 402 waits for responses from the DVM network 404. At 714, the DVM initiator 402 determines whether or not there are any new DVM operations. If there are, the flow returns to 702. If not, the flow proceeds to 716. At 716, the DVM initiator 402 de-asserts the DCDWakeUpRequest. When the DCDWakeUpRequest signal is de-asserted, the DVM-related clocks can be switched back to the divided clocks for power savings.

Figure 7B:
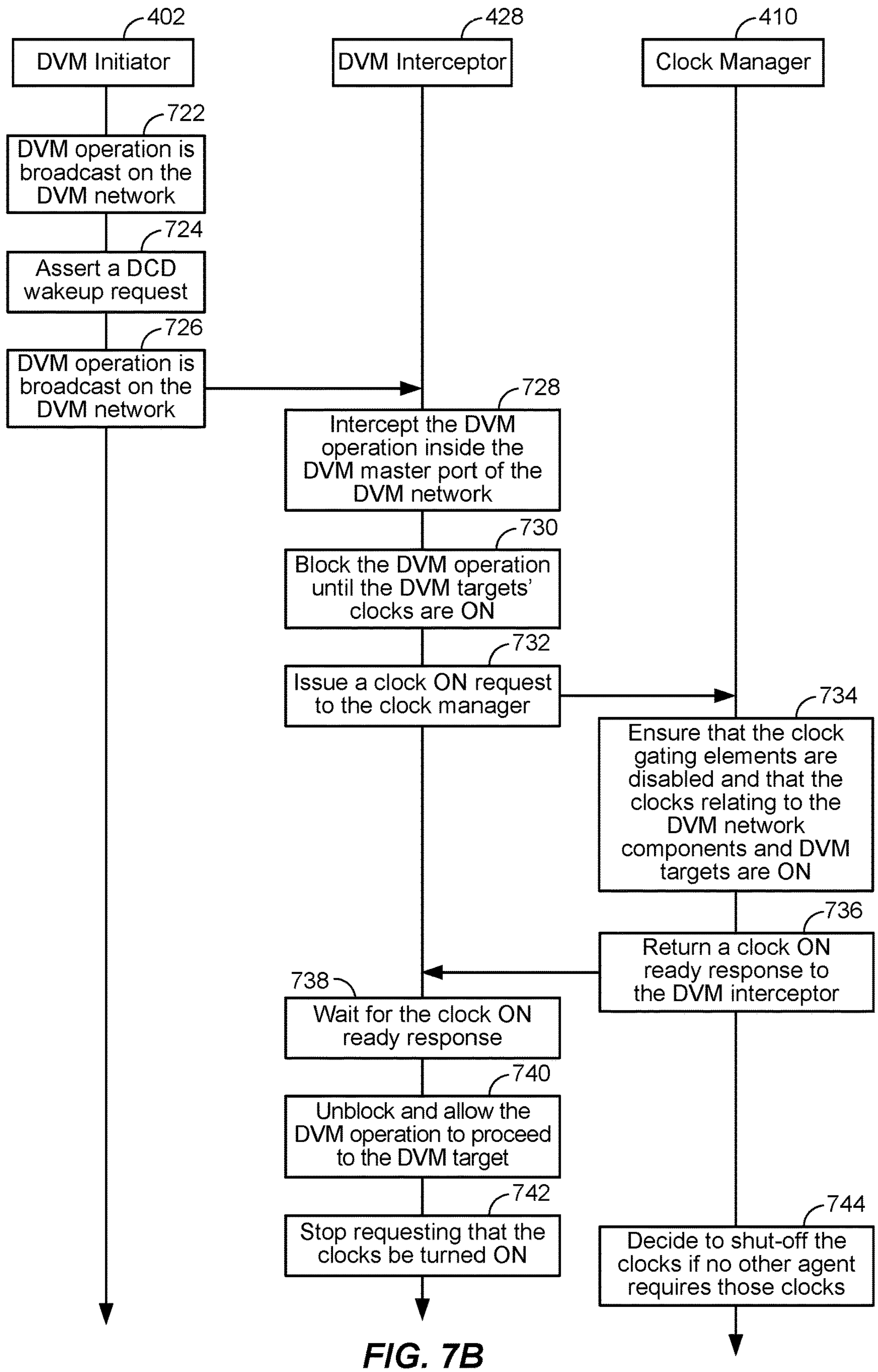
FIG. 7B illustrates an exemplary flow for automatic clock wake-up in the system of FIG. 4 according to at least one aspect of the disclosure.

FIG. 7B illustrates an exemplary flow for automatic clock wake-up in the system 400 of FIG. 4 according to at least one aspect of the disclosure. At 722, a DVM operation is broadcasted on the DVM network 404 in FIG. 4, as at 702 of FIG. 7A.

At 724, the CPU subsystem/DVM initiator 402 asserts a DCDWakeUpRequest signal as an "early" indication that there is a pending DVM operation, as at 704 of FIG. 7A. Note, the DCDWakeUPRequest signal is an "early" indication of a pending DVM request since it is asserted long before the DVM operation reaches the DVM target 406. The clock selectors 432A and/or 432B receive the DCDWakeUpRequest signal and respond by selecting the non-divided clock to send to the clock manager 410. The clock manager 410 uses these non-divided clocks as the clock source for the SMMU/DVM target. By using the "faster" non-divided clock, the DVM network 404 and DVM targets are able to respond faster to the DVM operations that are broadcast over the DVM network 404.

At 726, another DVM operation is broadcast over the DVM network 404 to all (or some) of the DVM targets. The present disclosure includes software programmed provisions to exclude a DVM target, such as the DVM target 406, from receiving DVM operations. Accordingly not all DVM targets will receive the "broadcasted" DVM operation.

At 728, the DVM interceptor 428 "intercepts" the DVM operation inside the DVM master port 412 of the DVM network 404. At 730, the DVM interceptor 428 blocks the DVM operation until the DVM targets' clocks are ON (referred to as "toggling"). At 732, the DVM interceptor 428 issues a DVMSMMUClockONRequest to the clock manager 410.

At 734, the clock manager 410 will ensure that the clock gating elements are disabled and that the clocks relating to the DVM network components and DVM targets are ON. At 736, once the clocks relating to DVM network components and DVM targets are ON, the clock manager 410 returns a DVMSMMUClockONReady response to the DVM interceptor 428.

At 738, the DVM interceptor 428 waits until the clock manager 410 returns the DVMSMMUClockONReady response. At 740, the DVM interceptor 428 "unblocks" and allows the DVM operation to proceed to the DVM target 406 (assuming it is not in the process of being power collapsed). The DVM target asserts "SMMUIsActive" signal for as long as the DVM target 406 is actively processing the DVM operation (or any other operation). When all of the DVM responses have returned and the DCDWakeUpRequest signal is de-asserted, the DVM-related clocks can be switched back to the divided clocks for power savings.

At 742, when all DVM responses have returned and exited the DVM network 404, the DVM interceptor 428 eventually stops requesting that the clocks be turned ON by deasserting the request signal DVMClockONRequest. This can be done, for example, when there are no DVM requests pending at the DVM interceptor 428 and when an amount of time (for example, a fixed number of clock cycles) has elapsed since the last DVM request was pending at the DVM interceptor 428. At this time, at 744, the clock manager 410 may decide to shut-off the clocks (referred to as "no toggle") if no other agent will use those clocks.

Figure 8:
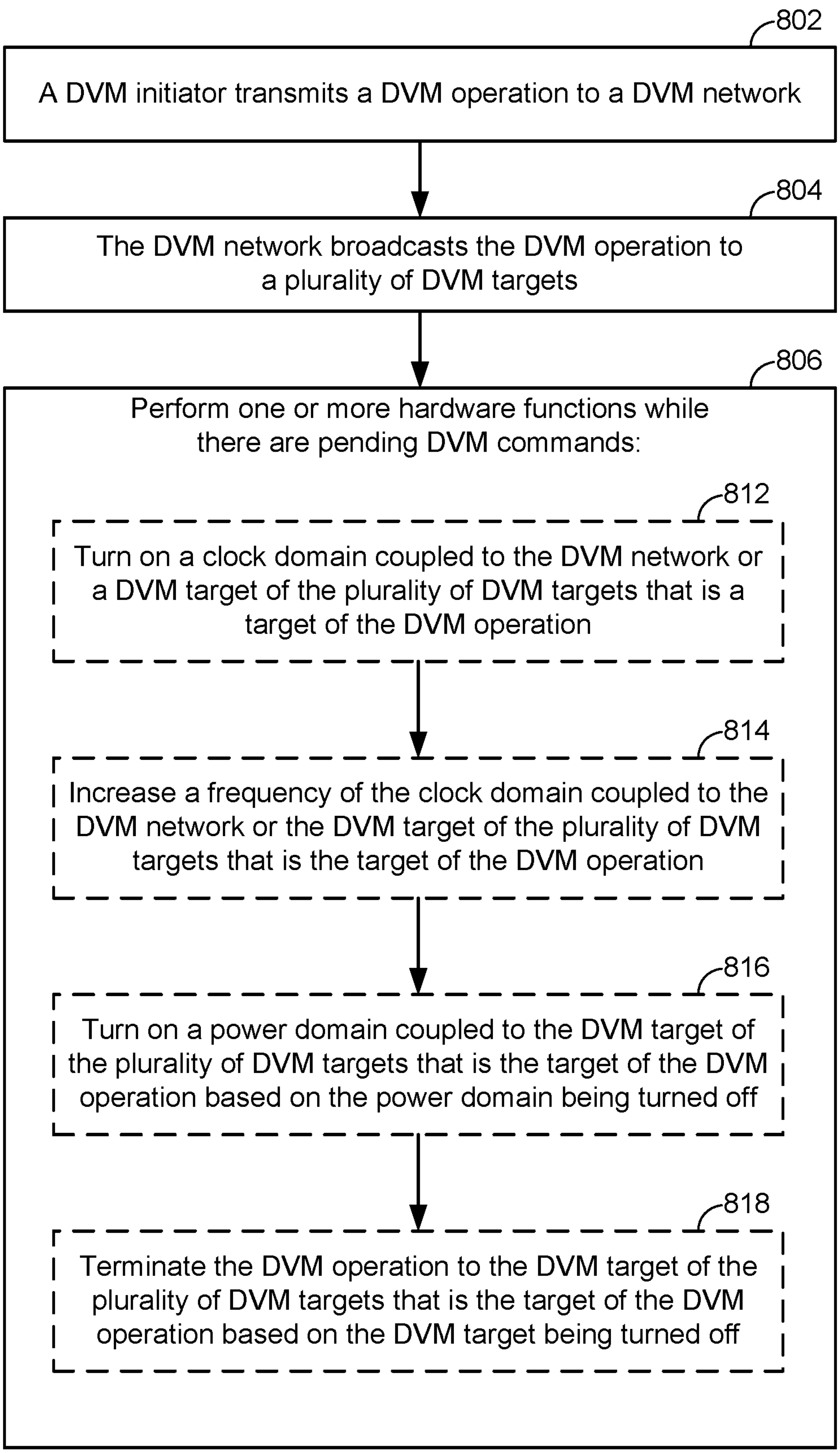
FIG. 8 illustrates an exemplary flow for full-hardware management of power and clock domains related to a DVM network according to at least one aspect of the disclosure.

FIG. 8 illustrates an exemplary flow for full-hardware management of power and clock domains related to a DVM network according to at least one aspect of the disclosure. The flow illustrated in FIG. 8 may be performed by the system 400 in FIG. 4.

At 802, a DVM initiator, such as the CPU subsystem/DVM initiator 402, transmits a DVM operation to a DVM network, such as the DVM network 404.

At 804, the DVM network, such as DVM network 404, broadcasts the DVM operation to a plurality of DVM targets, such as the DVM target 406.

At 806, based on the pending DVM operation being broadcasted to the plurality of DVM targets by the DVM network, one or more hardware functions are performed.

For example, at 812, a clock domain coupled to the DVM network (e.g., clock domain 324) or a DVM target (e.g., clock domain(s) 326/328) of the plurality of DVM targets that are a target of the DVM operation may be turned on.

Alternatively or additionally, at 814, a frequency of the clock domain coupled to the DVM network (e.g., clock domain 324) or the DVM target (e.g., clock domain(s) 326/328) of the plurality of DVM targets that is the target of the DVM operation may be increased.

Alternatively or additionally, at 816, a power domain coupled to a DVM target of the plurality of DVM targets that is the target of the DVM operation is turned on based on the power domain being turned off.

Alternatively or additionally, at 818, the DVM operation to the DVM target of the plurality of DVM targets that is the target of the DVM operation is terminated based on the DVM target being turned off. More specifically, if the DVM target of the plurality of DVM targets that is the target of the DVM operation is turned off, the DVM operation is terminated.

There are a number of benefits of hardware-managed power collapse, as disclosed herein. For example, the power management software can freely power collapse DVM targets without having to synchronize/coordinate with software that may be using the DVM networks. In-flight DVM operations still complete "successfully," even when targeting a DVM target with no power. Further, in some aspects, the issuance of a DVM operation will optionally power-ON the DVM targets without explicit instruction to manage power from the software.

There are also a number of benefits of hardware-managed clocking, as disclosed herein. For example, the issuance of a TLB invalidate instruction will turn-ON the associated clocks on the DVM network and DVM targets without explicit instruction to manage the clocks from the software. Further, the issuance of a TLB invalidate instruction (for example) will speed-up the associated clocks on the DVM network and DVM targets without explicit instruction to manage the clocks from the software. The result is a faster DVM network that does not rely on software management.

Other aspects of the disclosure include provisions to optionally and programmatically exclude a DVM target from participating in the DVM network. The programmability of said controls is software readable/writable from "privileged" or "secure" software. Other aspects include a provision/facility to automatically switch the clock source to an "always present" fast clock when the phase lock loops (PLLs) are disabled.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for full-hardware management of power and clock domains related to a distributed virtual memory (DVM) network, comprising:

transmitting, from a DVM initiator of a processor-based system of a device to the DVM network, a DVM operation;

broadcasting, by the DVM network to each of a plurality of DVM targets physically coupled to the processor-based system of the device, the same DVM operation, wherein the plurality of DVM targets comprises a plurality of memory management units, wherein the DVM network is included in a system bus of the processor-based system of the device between the DVM initiator and the plurality of DVM targets, and wherein the DVM network combines responses to the DVM operation received from the plurality of DVM targets into a single response for the DVM initiator; and based on the DVM operation being broadcasted to the plurality of DVM targets by the DVM network, turning on, by a power collapse manager of the processor-based system coupled to the plurality of DVM targets and the DVM network, a power domain coupled to the DVM target of the plurality of DVM targets that is the target of the DVM operation based on the power domain being turned off, wherein the power collapse manager does not send power on requests to the plurality of DVM targets over the DVM network.

2. The method of claim 1, wherein turning on the power domain coupled to the DVM target of the plurality of DVM targets that is the target of the DVM operation comprises:

issuing, by the power collapse manager coupled to the DVM network, a power on request to the power domain coupled to the DVM target that is the target of the DVM operation;

issuing, by the power collapse manager, a power on request to the DVM target that is the target of the DVM operation;

unblocking, by the DVM target that is the target of the DVM operation, DVM operations from the DVM network based on the power on request received from the power collapse manager;

reconnecting, by the DVM target that is the target of the DVM operation, to the DVM network; and transmitting, by the DVM network, the DVM operation to the DVM target that is the target of the DVM operation.

3. The method of claim 2, wherein issuing the power on request to the DVM target that is the target of the DVM operation is based on receiving, by the power collapse manager, a response from the power domain coupled to the DVM target indicating that the power domain coupled to the DVM target is turned on.

4. The method of claim 2, further comprising:

receiving a request to power on the DVM target that is the target of the DVM operation, wherein the request is received from software being executed by the DVM initiator; and sending a power status signal to the software indicating that the power domain coupled to the DVM target is turned on.

5. The method of claim 1, wherein the DVM initiator comprises a processor.

6. The method of claim 1, wherein the DVM operation comprises a translation lookaside buffer (TLB) invalidate operation, a synchronization operation, or any combination thereof.

7. The method of claim 1, wherein the DVM initiator is coupled to a separate clock domain and a separate power domain from a clock domain and a power domain of the DVM network.

8. The method of claim 1, wherein the plurality of DVM targets are coupled to clock domains and power domains separate from a clock domain and a power domain of the DVM initiator and a clock domain and a power domain of the DVM network.

9. The method of claim 1, wherein each of the plurality of DVM targets is coupled to a separate clock domain and a separate power domain from remaining ones of the plurality of DVM targets.

10. The method of claim 1, wherein the plurality of DVM targets is coupled to a single clock domain and a power domain.

11. An apparatus for full-hardware management of power and clock domains related to a distributed virtual memory (DVM) network, comprising:

a DVM initiator of a processor-based system of a device;

a plurality of DVM targets physically coupled to the processor-based system of the device;

a DVM network physically coupled to the DVM initiator and the plurality of DVM targets, wherein the plurality of DVM targets comprises a plurality of memory management units, wherein the DVM network is included in a system bus of the processor-based system of the device between the DVM initiator and the plurality of DVM targets, wherein the DVM network is configured to broadcast the same DVM operation from the DVM initiator to each of the plurality of DVM targets, and wherein the DVM network combines responses to the DVM operation received from the plurality of DVM targets into a single response for the DVM initiator, wherein, based on a DVM operation in the DVM network being broadcasted to the plurality of DVM targets, a power collapse manager of the processor-based system coupled to the plurality of DVM targets and the DVM network is configured to turn on a power domain coupled to the DVM target of the plurality of DVM targets that is the target of the DVM operation based on the power domain being turned off, wherein the power collapse manager does not send power on requests to the plurality of DVM targets over the DVM network.

12. The apparatus of claim 11, wherein the one or more memory management units each comprise a translation lookaside buffer (TLB).

13. The apparatus of claim 11, wherein the DVM initiator comprises a processor.

14. The apparatus of claim 11, wherein the DVM operations comprise a TLB invalidate operations, synchronization operations, or any combination thereof.

15. The apparatus of claim 11, wherein the DVM initiator is coupled to a separate clock domain and a separate power domain from a clock domain and a power domain of the DVM network.

16. The apparatus of claim 11, wherein the plurality of DVM targets are coupled to clock domains and power domains separate from a clock domain and a power domain of the DVM initiator and a clock domain and a power domain of the DVM network.

17. The apparatus of claim 11, wherein each of the plurality of DVM targets is coupled to a separate clock domain and a separate power domain from remaining ones of the plurality of DVM targets.

18. The apparatus of claim 11, wherein the plurality of DVM targets is coupled to a single clock domain and a power domain.

19. The apparatus of claim 11, wherein the DVM network reports the single response to the DVM initiator.

20. An apparatus for full-hardware management of power and clock domains related to a distributed virtual memory (DVM) network, comprising:

means for broadcasting of a processor-based system of a device communicatively coupled to a plurality of DVM targets coupled to the processor-based system of the device; and means for transmitting of the processor-based system of the device, to the means for broadcasting, a DVM operation, wherein the plurality of DVM targets comprises a plurality of memory management units, wherein the means for broadcasting is included in a system bus of the processor-based system of the device between the means for transmitting and the plurality of DVM targets, wherein the means for broadcasting is configured to broadcast, to each of the plurality of DVM targets, the same DVM operation, and wherein the means for broadcasting is configured to combine responses to the DVM operation received from the plurality of DVM targets into a single response for the means for transmitting, wherein, based on the DVM operation being broadcasted to the plurality of DVM targets by the means for broadcasting, a power collapse manager of the processor-based system coupled to the plurality of DVM targets and the means for broadcasting turns on a power domain coupled to the DVM target of the plurality of DVM targets that is the target of the DVM operation based on the power domain being turned off, wherein the power collapse manager does not send power on requests to the plurality of DVM targets over the DVM network.

21. The apparatus of claim 20, wherein the means for transmitting is coupled to a separate clock domain and a separate power domain from a clock domain and a power domain of the DVM network.

22. The apparatus of claim 20, wherein the plurality of DVM targets are coupled to clock domains and power domains separate from a clock domain and a power domain of the means for transmitting and a clock domain and a power domain of the DVM network.

* * * * *